Sept. 16, 1952          J. F. BENGTSSON          2,610,845
WEIGHING SCALE

Filed Aug. 11, 1947                          3 Sheets-Sheet 1

INVENTOR
J. Fredrik Bengtsson

Sept. 16, 1952    J. F. BENGTSSON    2,610,845
WEIGHING SCALE
Filed Aug. 11, 1947    3 Sheets-Sheet 2

INVENTOR
J. Fredrik Bengtsson

Sept. 16, 1952      J. F. BENGTSSON      2,610,845
WEIGHING SCALE

Filed Aug. 11, 1947      3 Sheets-Sheet 3

INVENTOR
J. Fredrik Bengtsson

Patented Sept. 16, 1952

2,610,845

UNITED STATES PATENT OFFICE 2,610,845

WEIGHING SCALE

Johan Fredrik Bengtsson, New York, N. Y.

Application August 11, 1947, Serial No. 768,009

3 Claims. (Cl. 265—62)

This invention relates to pendulum weighing scales and particularly to the class of scales which indicate the weight of an article placed on the scale platform as well as computing other data having relation to the weight and indicating the results of said computations, with the object of eliminating troublesome adjustments for accurate indicator readings and to make the readings more convenient.

My invention for this purpose is an arrangement which includes a vertically-suspended indicator over a rectangular chart and two adjustment-free power cylinders, through each of which the pendulum acts to offset the load. The invention also includes means for adjusting the angular positions of the pendulums without causing incorrect indicator readings.

The invention is described in the following, reference had to the accompanying drawings, in which Fig. 1 is a vertical section on the line 1—1, Fig. 2, with a front elevation of the weighing mechanism;

Similar numerals refer to similar parts in the several views.

Figure 1:
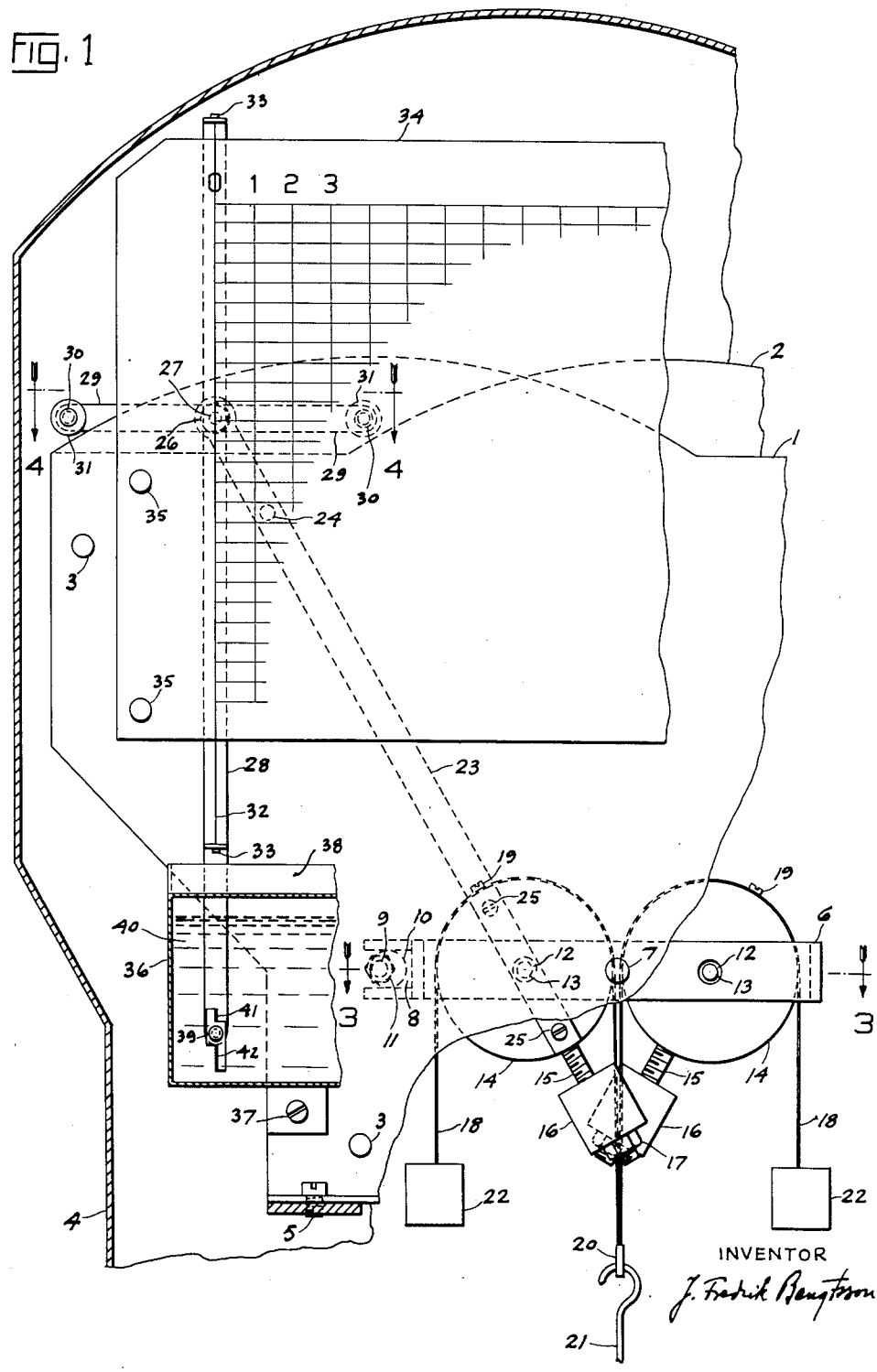
Figure 2:
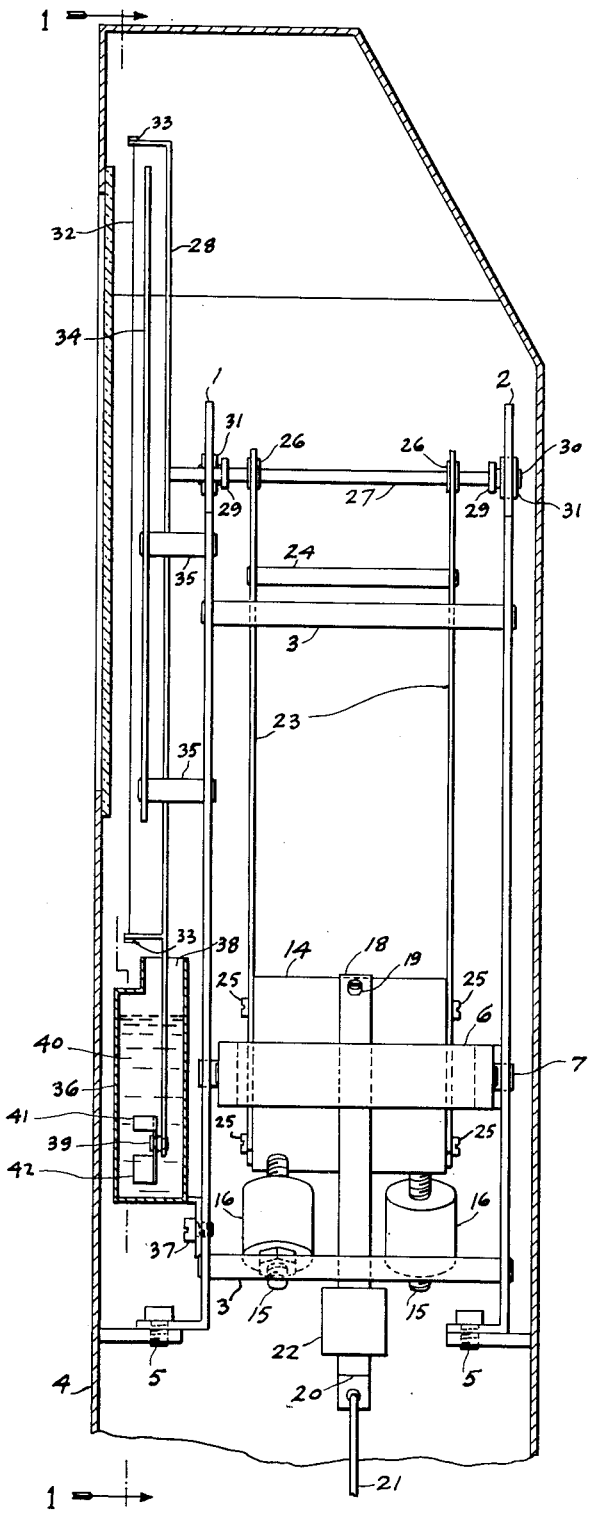
Fig. 2 is a cross section through the scale housing, with a side elevation of the weighing mechanism.
Figure 3:
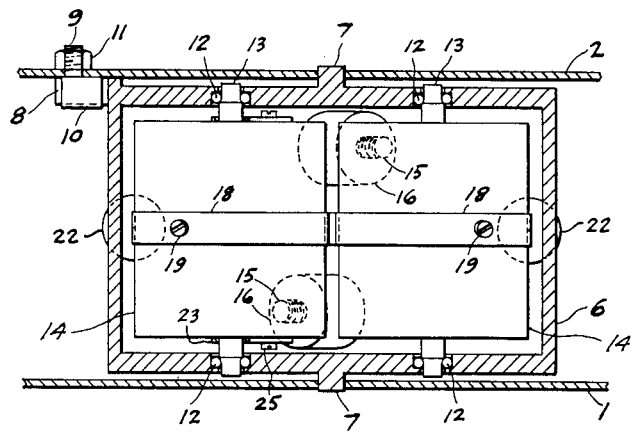
Fig. 3 is a horizontal section through the pendulum bracket and part of the frame on the line 3—3, Fig. 1, with a plan view of the power cylinders.
Figure 4:
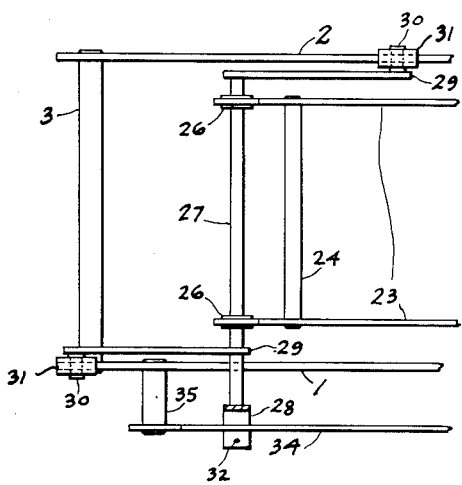
Fig. 4 is a horizontal section through the indicating member on the line 4—4, Fig. 1, with a plan view of the indicator guide means and part of the frame.

The weighing mechanism of the scale comprises a frame having two frame plates 1 and 2 tied together by spacer bolts 3 and fastened to the inside of the housing 4 by screws 5. A bracket 6 is mounted on the frame and made rotatable by means of trunnions 7, integral with the bracket, and provided with a slot 8 in spaced relation from said trunnions 7. A threaded stud 9 extends through a hole in the frame plate 2, and an eccentric member 10, carried by the stud 9, engages with the slot 8 of the bracket 6. A lock nut 11 holds the eccentric member 10 and the bracket 6 in a fixed position.

Two shafts 13 are mounted and are rotatable in ball bearings 12 provided in the bracket 6, one shaft on each side of the turning center of the bracket and parallel with the turning center. Affixed upon each of the shafts 13 is a load-counterbalancing pendulum comprising a power cylinder 14 concentric with the shaft 13, a threaded pendulum rod 15 extending from the peripheral face of the power cylinder, and an adjustable pendulum weight 16 held in place on the pendulum rod by a lock nut 17. A pendulum arm 23 comprising two side members tied together by a spacer bolt 24 it attached to the left-hand pendulum by means of screws 25 and extends from the pendulum fulcrum in a direction diametrically opposed to that of the pendulum rod 15. Parallel with the shaft 13 and mounted in ball bearings 26, so as to be rotatable, an indicator shaft 27 is provided at the free end of the pendulum arm 23. A flexible ribbon 18 is laid half around the peripheral face of each power cylinder 14, being attached thereto at one point by means of a screw 19, the ribbon ends depending from either side of the power cylinder. The adjoining ribbon ends, depending between the power cylinders 14, are joined together by a member 20 and are connected to the scale platform (not shown), which may be of any suitable design, by a link 21. To each free end of the ribbon 18 is attached a weight 22, the purpose of which is to give to the pendulum arm 23, as well as to the pendulum itself, a maximum range of travel on either side of the vertical through the pendulum fulcrum.

Fixed upon the shaft 27 and vertically suspended therefrom is an indicating carrier 28. Also attached upon the shaft 27 are two indicator guide arms 29 extending horizontally in opposite directions. The end of each guide arm 29 is provided with a lateral pivot 30, on which is located a roller, or ball bearing 31. For indicating purposes a cord 32, hereinafter called the indicator, is attached to the indicating member 28 by means of clips 33, so that it extends vertically over the rectangular chart 34 fixed to the frame plate 1 by spacer bolts 35.

To prevent the indicating member 28 from swinging too freely under the action of gravity and momentum during movement, the upper portions of the frame plates 1 and 2 are formed as arcuate guide surfaces along which the peripheral faces of the rollers 31 travel. In equilibrium, certain clearances are provided between the rollers 31 and said guide surfaces, so that the frame plates will not interfere with the sensitivity of the scale. The indicator in the course of movement cannot swing more than allowed by said clearances.

To dampen the vibrations and oscillatory movements of the indicating member 28, there is an oblong dash pot 36, containing oil 40, fastened to the inside of the housing 4 by means of screws 37. Along the entire length of the pot is an opening 38 into which the lower portion of the indicating member 28 is inserted. The indicating member 28 is provided with a laterally projecting pivot 39. Submerged in the oil 40, and mounted on the pivot 39, is an oscillatory, light shim having two vertical, laterally projecting blades 41 and 42 on opposite sides of the pivot 39. The lower blade 42 is somewhat larger and heavier than the upper blade 41, so that in equilibrium the shim will hang freely and perpendicularly on the pivot 39. When the indicating member 28 starts to move, due to the change of load on the scale platform, the blades 41 and 42 will assume a more or less horizontal position on the pivot 39, due to a greater oil pressure on the larger blade 42 than on the smaller blade 41. The oil resistance against the indicating member 28 moving from one position to another is thereby minimized. While the weighing mechanism gradually assumes a new equilibrium, the blades will also gradually assume their perpendicular position. The vibrations and oscillatory movements of the indicating member will thus be obviated, due to the presentation of the flat surfaces of the shim against the oil in the dash pot.

The weight of the indicating member 28 and the weights of all parts attached to it react on the fulcrums 26 of the pendulum arm 23. The center of gravity of these weights, together with the weights of all parts turning about the shaft 13 of the left-hand pendulum, is located below said shaft 13 and on the center line through the shafts 13 and 27, said center line being herein called the pendulum line of the left-hand pendulum. Therefore, these combined weights act as a force in their center of gravity located on the pendulum line of the left-hand pendulum. And, correspondingly, the center line through the shaft 13 of the right-hand pendulum and the center of gravity of all parts turning about said shaft 13 is the pendulum line of the right-hand pendulum.

It is important that the two pendulum lines form equal angles with the vertical. By turning the stud 9, the eccentric member 10 engaging with the slot 8 of the bracket 6 will cause said bracket 6 to turn on its trunnions 7, whereby one of the pendulums is raised and the other is lowered. This will adjust the angular positions of the pendulum lines to form equal angles with the vertical.

The load-counterbalancing pendulums are affected by the load at the link 21, by the constant weights 22, and by the resultant forces acting on the pendulum lines. These weights and forces produce turning moments on the load-counterbalancing pendulums.

In equilibrium, the sum of the turning moments acting in the same direction is equal to the turning moments acting in the opposite directions.

Figure 5:
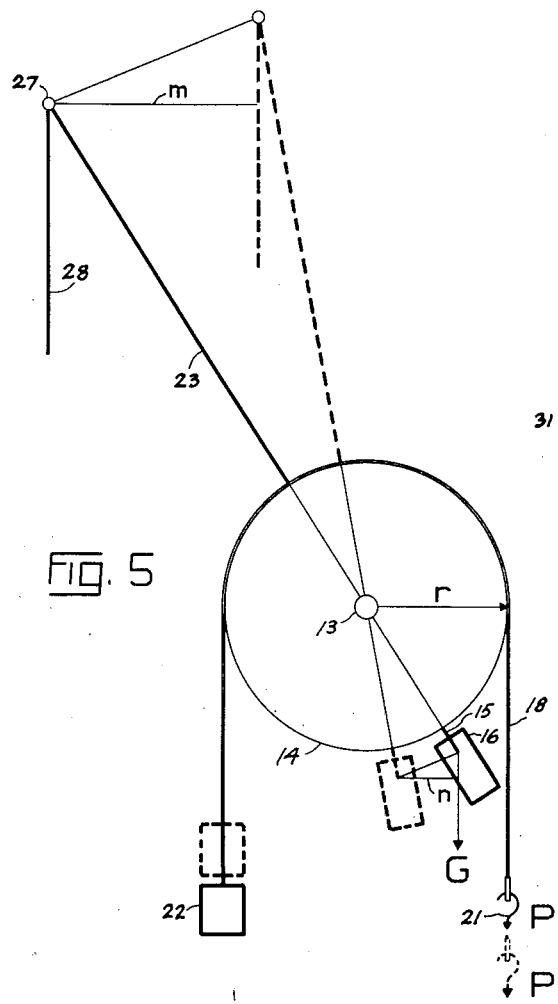
Fig. 5 is a diagrammatic illustration explaining the principle of the weighing mechanism.

Fig. 5 illustrates diagrammatically the balancing condition of the weighing mechanism and the movement of the indicator. Only one pendulum is shown, because both pendulums described are coordinated and act as one. G is the described resultant force on the pendulum line through shafts 13 and 27; P is the load acting at one end of the ribbon 18 on the power cylinder 14 having a radius $r$; and the weight 22 is constant at the other end of the ribbon 18. With the mechanism in equilibrium, as indicated with heavy, full lines, the clockwise turning moments produced on the pendulum by G and P are together equal to the counterclockwise turning moment produced by 22. An increase $p$ to the load will move the pendulum and the indicator to a new position of equilibrium, indicated with dotted lines. It is evident that the increase in turning moment represented by $p \times r$ is equal to the decrease represented by $G \times n$, where $n$ is the horizontal change in position of G. As G and $r$ are constant factors, this means that $n$ is in proportion to the increase $p$. As $n$ and $m$ are proportional, being sides in two similar triangles, it follows that the horizontal travel $m$ of the indicator is proportional to the increase $p$. The horizontal weight graduations on the chart 34 are therefore equally spaced.

Having described my invention, I claim:

1. In a weighing scale, a frame, a bracket comprising two trunnions mounted on said frame and rotatable on said trunnions, two co-operative load-counterbalancing pendulums, each having a power cylinder and being ribbon-connected to a load, said pendulums being rotatably mounted on said bracket and one on either side of said bracket trunnions, means for adjusting said bracket about its trunnions in order to equalize the angularity of said pendulums, a chart, an indicator connected with said pendulums and movable over the chart, dampening means for said indicator, and gravity means for enabling said pendulums to counterbalance the load on either side of the vertical through the pendulum fulcrum.

2. In a weighing scale, a frame, a bracket comprising two trunnions mounted on said frame and rotatable on said trunnions, and provided with a slot in spaced relation from said trunnions, two co-operative load-counterbalancing pendulums rotatably mounted on said bracket and one on either side of said bracket trunnions, a stud rotatably mounted in said frame, an eccentric member carried by said stud and engaging with said slot for adjusting said bracket about its trunnions in order to equalize the angularity of said pendulums, and means for locking said bracket.

3. In a weighing scale, a frame, load-counterbalancing pendulums pivotally supported on said frame, a chart, a pendulum arm responsive to movement of said pendulums, an indicating carrier pivotally connected with said pendulum arm and extending vertically from top to bottom of said chart and movable transversely thereover, an indicator attached to said indicating carrier and coordinating with said chart, two guide arms affixed to said indicating carrier and extending horizontally from the pivot of the indicating carrier and in opposite directions to each other, the free end of each said guide arm being provided with a lateral pivot, and a roller mounted on said pivot, the upper portions of said frame being formed as arcuate guide surfaces along which the peripheral faces of said rollers travel for maintaining said indicating carrier vertical during traverse of said chart.

JOHAN FREDRIK BENGTSSON.

REFERENCES CITED

The following references are of record in the file of this patent:

UNITED STATES PATENTS

| Number | Name | Date |
|---|---|---|
| 106,560 | Dickinson | Aug. 23, 1870 |
| 962,332 | Forbes | June 21, 1910 |
| 1,650,224 | Mittendorf | Nov. 22, 1927 |
| 1,729,788 | Mittendorf | Oct. 1, 1929 |
| 2,062,461 | Le Fevre | Dec. 1, 1936 |
| 2,165,275 | Kimball | July 11, 1939 |
| 2,244,587 | Williams | June 3, 1941 |
| 2,315,789 | Hadley | Apr. 6, 1943 |

FOREIGN PATENTS

| Number | Country | Date |
|---|---|---|
| 400,852 | England | Nov. 2, 1933 |
| 594,515 | France | Sept. 14, 1925 |